3,147,239
PRODUCTION OF SOLID OLEFIN POLYMERS UTILIZING A CATALYST SYSTEM CONTAINING ELEMENTAL SULFUR
Peter J. Canterino, Bartlesville, Okla., and Lon T. Smith, Lake Jackson, Tex., assignors to Phillips Petroleum Company, a corporation of Delaware
No Drawing. Filed Aug. 22, 1960, Ser. No. 50,835
8 Claims. (Cl. 260—93.7)

This invention relates to the production of solid olefin polymers. In one aspect, this invention relates to an improved process for preparing from certain selected olefins solid polymers having high isotactic content. In accordance with another aspect, this invention relates to an improved process for substantially increasing the isotactic content and flexural modulus values of polymers of 1-olefins prepared in the presence of initiator systems of the organometal and related types by incorporation of an adjuvant material in the initiator system.

Various reactions for polymerizing olefins are described in the literature, and the polymerizations are usually carried out in the presence of initiators (often referred to as catalysts). The polymerization of 1-olefins, such as propylene, in the presence of initiator systems, such as a combination of a chloride of titanium, particularly titanium trichloride, with a trialkylaluminum, is well known. It has been observed that in such polymerizations, the product is characterized by the presence of greater or lesser amounts of a crystalline component referred to as isotactic polymer. This isotactic polymer derives its crystalline characteristics from an orderly arrangement of asymmetric tertiary carbon atoms in the molecular configuration. The amount of isotactic polymer contained in the total polymer product formed in any given polymerization appears to have a significant influence on certain properties of the polymer product, such as hardness, modulus, ultimate tensile strength, range of melting temperatures, and molding and fiber forming properties. The higher the isotactic content of the polymer, the more outstanding are the physical properties of that polymer. Thus, any process whereby the isotactic content of an olefin polymer can be increased is a significant contribution to the art. The present invention relates to such an improvement wherein the isotactic and flexural modulus values, in particular, of polymers of 1-olefins are substantially increased.

Accordingly, an object of this invention is to provide an improved process for producing isotactic polymers.

Another object of this invention is to provide a process for preparing polymers having isotactic contents and flexural modulus values which are higher than those of conventionally prepared polymers.

A further object of this invention is to provide an improved process in which polymers of high isotactic content are obtained.

Other objects, aspects as well as the several advantages of the invention will become apparent to those skilled in the art upon a study of the accompanying disclosure and the appended claims.

In accordance with the present invention, we have discovered, quite unexpectedly, that certain olefin polymers of very high isotactic content and flexural modulus values can be prepared if the polymerization is carried out in the presence of elemental sulfur as an initiator adjuvant therefor.

More specifically, in a process in which an olefin corresponding to the formula $$R-CH=CH_2$$

and wherein R is an alkyl radical containing from 1 to 4 carbon atoms or a phenyl or alkyl substituted phenyl radical, is polymerized in the presence of an initiator system (often referred to as a catalyst system) which forms on mixing components comprising (a) a metal, a metal hydride or organometal compound of a metal of Groups I, II, or III of the Periodic System and (b) a compound of a metal of Groups IV, V, VI or VIII of the Periodic System, the instant invention resides in the improvement of conducting the polymerization in the presence of elemental sulfur as an adjuvant material.

When proceeding in accordance with the present invention, it has been found that polymers having isotactic contents in the range of 83 to 88 percent, and higher, can be readily prepared. In comparison, if the polymerization is conducted in the absence of the adjuvant of this invention with an initiator mixture comprising, for example, titanium trichloride and triethylaluminum, the isotactic content of the polymer is usually around 80 percent. Furthermore, it has been found that the addition of the adjuvant material of this invention to the above initiator system that polymers having flexural modulus values in the range of $155 \times 10^3$ to about $250 \times 10^3$ p.s.i. and higher can be readily prepared. In comparison, if the polymerization is conducted in the absence of the adjuvant of this invention with the above initiator system, the flexural modulus of the polymer is usually around $125 \times 10^3$ p.s.i. The reason for the unexpected improvement obtained when utilizing the elemental sulfur in the process of this invention is not completely understood. However, it is apparent that the adjuvant material acts to modify the action of the initiator system so that the polymer product is one having a high isotactic content and flexural modulus values. In general, the addition of elemental sulfur to the polymerization system as herein described makes it possible to obtain a polymer product having a higher isotactic content and flexural modulus value than that obtainable in its absence.

The olefins which are polymerized in accordance with the present process correspond to the formula $$R-CH=CH_2$$

wherein R is selected from the group consisting of an alkyl radical containing from 1 to 4, inclusive, carbon atoms, a phenyl radical and an alkyl-substituted phenyl radical. The total number of carbon atoms in the alkyl group substituted on the phenyl radical preferably does not exceed 6 carbon atoms. Examples of suitable olefins include propylene, 1-butene, 1-pentene, 2-methyl-1-butene, 2-methyl-1-pentene, 4-methyl-1-pentene, 3,3-dimethyl-1-butene, styrene, 2-methylstyrene, 4-methylstryrene, 3-ethylstyrene, 3-ethyl-4-methylstyrene, 3,4-diethylstyrene, 2,4-di-n-propylstyrene, 2,4-diethylstyrene, and the like. It is often preferred to utilize this invention when propylene is employed as the monomer.

The polymerization process of this invention is conducted in the presence of a catalyst system which forms on mixing two or more components wherein one component is an organometal compound, including compounds where one or more, but not all, organo groups are replaced by halogen, a metal hydride, or a metal of Groups I, II or III, and the second component is a Group IV, V, VI or VIII (Mendeléeff's Periodic System) metal compound. The organometal compounds referred to include, without limitation, alkyl, cycloalkyl or aryl compounds of mono-, di-, tri-, or tetravalent metals, particularly aluminum, gallium, indium, beryllium, sodium, potassium, lithium, rubidium, cesium, magnesium, cadmium, mercury, zinc, barium, or such organometal compounds where one or more, but not all, of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc fluoride, and $CH_3AlCl_2$, $(CH_3)_2AlCl$, $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$, $C_{20}H_{41}GaBr_2$, $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are appliacble as a class, the most important members being sodium, magnesium and aluminum.

The compounds of the metals of Groups IV, V, VI and VIII of the Periodic System include the oxides, hydrides, halides, oxyhalides and salts of organic acids, usually having 20 or less carbon atoms, such as formic acid. It is usually preferred to employ compounds of titanium, zirconium, hafnium, chromium, thorium, molybdenum, vanadium, niobium, tantalum and iridium. Of the various compounds, it is generally preferred to employ the titanium halides, including the chlorides, fluorides, bromides and iodides, particularly the tri- and tetrachlorides, the tri- and tetrabromides, and the tri- and tetraiodides of titanium, a particularly preferred species being titanium trichloride.

A third catalyst component which can be advantageously used is an organic halide or metal halide where the organic radical has 30 or less carbon atoms and is an alkyl, cycloalkyl or aryl group. Specific examples include ethyl bromide, ethyl trichloro titanium, bromobenzene, cyclohexyl chloride, and the like. Also applicable as third catalyst components are the alkali metal and ammonium halides, and aluminum halides (where the catalyst also includes another metal compound such as a titanium compound), a halogen, a hydrogen halide, an organophosphorus-containing compound, and a peroxide.

Examples of suitable catalyst systems in accordance with the foregoing disclosure are as follows:

(a) Aluminum trialkyls, e.g., triethylaluminum or triisobutylaluminum, and the tri- or tetravalent metal halides of Groups IV–A and V–A of the type represented by the tri- and tetrachlorides, the tri- and tetraiodides and the tri- and tetrabromides of titanium, zirconium, hafnium, vanadium, niobium, and tantalum;

(b) An organic halide, such as ethyl bromide, a Group IV inorganic halide, such as titanium tetrachloride, and a low valence metal selected from the group consisting of alkali metals, beryllium, magnesium, zinc, cadmium, mercury, aluminum, gallium, indium and thallium, for example, magnesium, ethyl bromide, and titanium tetrachloride, as such, or with the addition of metallic aluminum;

(c) A Group IV metal halide, for example, titanium tetrachloride, and a metal identified in (b), for example, sodium, aluminum or magnesium;

(d) A mixture of titanium hydride and an organometal compound exemplified by an aluminum alkyl halide, i.e., a mixture of titanium hydride and ethylaluminum sesquichloride;

(e) Titanium dioxide and an organometal compound such as trialkylaluminum or aluminum alkyl chlorides, e.g., a mixture of titanium dioxide and ethylaluminum sesquichloride;

(f) A mixture of molybdenum pentachloride and organometal compounds exemplified by triisobutylaluminum or triethylaluminum and ethylaluminum dichloride;

(g) A mixture of complex metal halides, exemplified by potassium fluotitanate, and an organometal compound exemplified by triethylaluminum and diethylaluminum chloride;

(h) A mixture of a derivative selected from the oxides of molybdenum, alkali metal and ammonium molybdate, and an organometal compound exemplified by triisobutylaluminum and isobutylaluminum dichloride;

(i) A mixture of a derivative of iridium, platinum, and osmium, selected from the group consisting of halides or oxides, and complex compounds of iridium, platinum and osmium, the complex compounds corresponding to the formula $M_xM'X_y$, wherein M is an alkali metal or an ammonium radical, M' is iridium, platinum or osmium, X is a halogen, and $y$ is at least one and the sum of $x$ and $y$ is equal to the valence of M', and a metallic organic compound exemplified by triethylaluminum, for example, iridium chloride and triethylaluminum or ethylaluminum sesquichloride;

(j) At least one derivative selected from the group consisting of oxides, halides, and oxyhalides of vanadium and complex salts of said halides with a member selected from the group consisting of ammonium halide and an alkali metal halide, and an organometal compound exemplified by triethyl aluminum, for example, vanadium oxide or vanadium chloride and triethylaluminum;

(k) A mixture of a derivative of a Group VI metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium, and ammonia and an organometal compound exemplified by triethylaluminum, for example, molybdenum pentachloride and ethylaluminum dichloride;

(l) A chromyl halide and at least one of the following (1) a metal hydride or an organometal compound, and (2) a mixture of an organic halide and a metal, for example, chromyl chloride, ethyl bromide and magnesium;

(m) At least one halide of titanium, zirconium or hafnium, and at least one hydride of lithium, sodium, potassium, rubidium, cesium, magnesium, calcium, strontium, barium, lanthanum, or thorium, for example, zirconium tetrachloride and calcium hydride;

(n) (1) A hydrocarbon derivative of one of the metals zinc, cadmium, mercury, and magnesium, and (2) a member selected from the group consisting of halides of titanium, zirconium, vanadium and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(o) (1) A tri- or tetrahalide of titanium, zirconium, hafnium and germanium, (2) an organophosphorus-containing compound, and (3) at least one of the following, (a) an organometal compound, (b) a mixture of an organic halide and a metal, and (c) a complex hydride, for example ethylaluminum sesquichloride, titanium tetrachloride and triphenylphosphine;

(p) (1) A tri- or tetrahalide of titanium, zirconium, hafnium or germanium, (2) a peroxide of the formula R'''OOR''', wherein R''' is hydrogen, alkyl, aralkyl, alkaryl, cycloalkyl, acyl, alkyne, or aryl, and (3) at least one of the following: (a) an organometal compound, (b) a mixture of an organic halide and a metal, and (c) a complex hydride, for example, ethylaluminum sesquichloride, titanium tetrachloride and benzoyl peroxide;

(q) (1) A halide of titanium, zirconium, hafnium, or germanium, (2) a hydride selected from the group consisting of hydrides of aluminum, gallium, indium, and thallium, and complexes of said hydrides with alkali metal hydrides, and (3) an organic halide, for example, titanium tetrachloride, lithium aluminum hydride and ethyl bromide.

The ratio of the catalyst components employed in the present process can be varied rather widely, depending upon the particular monomer used and the operating conditions. The mol ratio of the organometal compound, metal hydride or Groups I, II or III metal to the Group IV, V, VI or VIII metal compound is usually in the range of 1:1 and 10:1 with a preferred range being 2:1 and 5:1. The concentration of catalyst in the polymerization zone is usually in the range of 0.01 to 5 weight percent, based on the monomer charged to that zone, although lesser or greater amounts can be used. The adjuvant of the invention is incorporated in the catalyst composition in a ratio of 0.1 to 2.5 gram atoms per mol of the Group IV, V, VI or VIII metal compound. Addition of the additive material can be made at any point in the preparation of the catalyst. A convenient method of operation is to add the adjuvant along with the diluent in the initial charge of the reactor.

The polymerization process of this invention is usually carried out in the presence of a diluent, preferably a hydrocarbon diluent which is not detrimental to the polymerization reaction. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes, and the like. Mixtures of any of the aforementioned hydrocarbons can be used as the diluent. The relative amounts of diluent and olefin employed in the polymerization depend upon the particular conditions and techniques used and are generally governed by the capacity of the apparatus to effect suitable agitation and heat removal. In general, the total olefin content of the feed mixture charged to the polymerization reactor is in the range of 0.5 to 25 weight percent of the diluent present in the reactor. In some instances, by conducting the reaction under suitable conditions of temperature and pressure, the monomer can also serve as a diluent for the reaction.

The polymerization can be carried out at a temperature varying over a rather broad range, for example, from 100 to 500° F. However, it is usually preferred to conduct the reaction at a temperature in the range of 150 to 350° F. The pressures employed in the process can vary from atmospheric, and below, to as high as 35,000 p.s.i.g., but it is preferred to operate at a pressure in the range of 50 to 1500 p.s.i.g. In general, pressures are satisfactory which are sufficient to maintain the reaction mixture essentially in the liquid phase. While liquid phase operation can be ensured by suitable regulation of the pressure, it should be understood that conducting the process under vapor phase conditions in the absence of a diluent is within the scope of the invention, sometimes being a preferable means of operation. The residence time can vary within rather wide limits depending upon certain variables such as pressure, temperature and efficiency of contacting. In a continuous process, the residence time can vary from about 1 second to 5 hours, or more, while in a batch process, the residence time can be as high as 24 hours and higher.

Various materials are known to be detrimental to the initiator systems employed in the invention. These materials include carbon dioxide, oxygen, water and the like. It is highly desirable, therefore, that the monomer or monomers be freed of these materials as well as other materials which may tend to inactivate the initiator. Any of the known means for removing such contaminants can be used. Furthermore, when a diluent is used in the process, it is preferred that this material be substantially freed of materials such as water, oxygen and the like. Also, it is desirable to remove air and moisture from the reaction vessel in which the polymerization is to be conducted.

Numerous variations in operative procedure can be employed. The process of this invention can be carried out as a batch process by pressuring the olefin to be polymerized into a reactor containing the initiator, elemental sulfur, and the diluent. The sulfur is added to the initiator composition prior to the contact of these materials with the olefin to be polymerized. This can be conveniently accomplished by mixing the adjuvant material with the diluent prior to the addition of initiator to the diluent. However, it is to be understood that the sulfur can be added at any point during the preparation of the initiator composition. It is also within the scope of the invention to preform the initiator system by reacting the initiator components within a separate initiator preparation vessel. The process of this invention can also be carried out continuously by maintaining the above-described concentration of reactants in the reactor for a suitable residence time.

Upon completion of the polymerization, any excess olefin is vented and the contents of the reactor are then treated by any suitable method to inactivate the initiator and recover the polymer product. In accordance with one method, inactivation of the initiator is accomplished by washing with an alcohol, water or other suitable materials. Such a treatment with an alcohol also causes precipitation of the polymer which can then be separated from the alcohol and diluent by any suitable method such as decantation or filtration. When the process is carried out continuously, the total effluent from the reactor can be pumped to an initiator inactivating zone where the reactor effluent is contacted with a suitable initiator inactivating material. It is, of course, to be realized that it is within the scope of the invention to employ other suitable systems to recover the polymer from the reactor effluent. The diluent can be recovered by any suitable means, for example, by fractional distillation, and reused in the process.

A better understanding of our invention will be obtained upon reference to the following illustrative examples which are not intended, however, to be unduly limitative of the invention.

EXAMPLE I

A series of runs was made to determine the effect of sulfur as an adjuvant in propylene polymerization in the presence of a catalyst formed by mixing triethylaluminum and titanium trichloride. In each of the runs, 175 ml. of cyclohexane was charged to a 300 ml. stainless steel reactor. After purging with prepurified nitrogen, the TiCl$_3$ and sulfur were added and the reactor sealed. The TEA was then added by a hypodermic syringe. The system was flushed with propylene and a charge of 30 grams of propylene added. The temperature was elevated to 225° F. and maintained at that level through the reaction period, the pressure being maintained at about 150 p.s.i.g. by bleeding in the propylene from time to time. At the end of about 1.5 hours, the reactor contents were cooled and washed in a Waring Blendor with isopropanol and methanol after which the polymer was recovered and dried. Data on these runs are shown in Table I.

Table I

| Run No. | TEA | | TiCl₃ | | Sulfur | | Mol ratio, TEA/TiCl₃/S | Productivity, gm. polymer/ gm. total initiator | Isotactic (percent) | Flex. Mod., p.s.i. ×10³ |
|---|---|---|---|---|---|---|---|---|---|---|
| | (gm.) | (mm.) | (gm.) | (mm.) | (gm.) | (mg. at.) | | | | |
| 1 | | | | | | | 3/1 | 65 | 80 | 125 |
| 2 | 0.342 | 3.00 | 0.156 | 1.01 | 0.0032 | 0.1 | 3/1/0.1 | 56 | 81 | 180 |
| 3 | 0.343 | 3.10 | 0.154 | 1.00 | 0.0064 | 0.2 | 3.1/1/0.2 | 50 | 85 | 198 |
| 4 | 0.366 | 3.21 | 0.175 | 1.14 | 0.01 | 0.31 | 2.8/1/0.27 | 40 | 83 | 190 |
| 5 | 0.342 | 3.00 | 0.167 | 1.08 | 0.019 | 0.59 | 2.8/1/0.55 | 36 | 87 | 185 |
| 6 | 0.42 | 3.69 | 0.174 | 1.13 | 0.105 | 3.3 | 3.4/1/2.9 | None | | |
| 7 | 0.48 | 4.20 | 0.209 | 1.35 | 0.047 | 1.4 | 3.1/1/1.0 | 62 | 87 | 174 |
| 8 | 0.501 | 4.39 | 0.169 | 1.10 | 0.010 | 0.31 | 4.0/1/0.28 | 48 | 85 | 246 |
| 9 | 0.54 | 4.7 | 0.171 | 1.11 | 0.010 | 0.312 | 4.2/1/0.28 | 70 | 83 | 196 |
| 10 | 0.592 | 5.18 | 0.201 | 1.32 | 0.012 | 0.376 | 3.9/1/0.28 | 68 | 86 | 179 |
| 11 | 0.592 | 5.18 | 0.202 | 1.32 | 0.012 | 0.376 | 3.9/1/0.28 | 66 | 88 | 155 |
| 12 | 0.46 | 4.0 | 0.146 | 0.947 | 0.008 | 0.250 | 4.2/1/0.26 | 74 | 83 | 173 |
| 13 | 0.56 | 4.9 | 0.147 | 0.954 | 0.008 | 0.250 | 5.1/1/0.26 | 60 | 83 | 186 |
| 14 | 0.752 | 6.6 | 0.178 | 1.15 | 0.010 | 0.312 | 5.7/1/0.27 | 70 | 88 | 166 |
| 15 | 0.88 | 7.7 | 0.188 | 1.22 | 0.023 | 0.72 | 6.3/1/0.54 | 68 | 88 | 172 |
| 16 | 0.96 | 8.4 | 0.244 | 1.58 | 0.012 | 0.376 | 5.3/1/0.24 | 64 | 81 | 189 |

For the purposes of the present invention, isotactic content is defined as the portion of the polymer not extracted by boiling heptane under conditions described in Example II. Flexural modulus values are obtained by A.S.T.M. D-790-49T.

The foregoing data demonstrate that the incorporation of small amounts of sulfur in the initiator system TEA/ TiCl₃ and polymerization of propylene in the presence thereof, the isotactic content as measured by insolubility in boiling heptane is substantially higher than when operating in its absence and that flexural modulus values are much increased over the control.

EXAMPLE II

A one gallon stainless steel reactor was charged with one liter of cyclohexane, the reactor being purged with dry nitrogen prior to and during the charging procedure. To this system was added a weighed amount of titanium trichloride and sulfur. The reactor was then closed and flushed twice with nitrogen at 100 p.s.i.g. Through the charging tube was introduced 500 ml. cyclohexane in which was dissolved a weighed amount of triethylaluminum, this charge being followed by an additional 500 ml. cyclohexane as a rinse. The reactor was then flushed twice with propylene at 100 p.s.i.g. after which 0.6 pound of propylene was charged. The temperature was raised to 225° F. and maintained between this temperature and 260° F. for the duration of the run. After about 1.5 hours, additional propylene was introduced to maintain a pressure of about 150 p.s.i.g. At the end of 2.5 hours the stirrer was stopped, the propylene feed shut off, and the reactor cooled.

The contents of the reactor were removed and washed in a Waring Blendor; first with about 3 liters of isopropanol, then with an equal volume of methanol, after which the polymer was recovered and dried at 80° C. in a vacuum oven.

The isotactic content of each product in the examples was determined by placing 2.5±0.1 grams of polymer in a weighed extraction thimble, and extracting in an A.S.T.M. Rubber Extraction apparatus for 2.5 hours with 100 ml. normal heptane. The thimble was then removed, dried in a forced air oven at 110° C. for 2 hours, cooled in a desiccator and weighed. The weight percent of residue, based on original polymer, was calculated and recorded as isotactic content. Data on these runs, together with a suitable control are shown in Table II.

Table II

| Run No. | TEA | | TiCl₃ | | Sulfur | | Ratio, TEA/ TiCl₃/S | Prod., g./g. cat. | Isotactic (percent) |
|---|---|---|---|---|---|---|---|---|---|
| | (gm.) | (mm.) | (gm.) | (mm.) | (gm.) | (mg. at.) | | | |
| 17 | 1.46 | 12.8 | 0.657 | 4.26 | 0.0409 | 1.27 | 3/1/0.3 | 371 | 88.4 |
| 18 | 1.74 | 15.3 | 0.490 | 3.84 | 0.037 | 1.15 | 4/1/0.3 | 137 | 85.2 |
| 19 | 1.44 | 12.7 | 0.664 | 4.30 | | | 2.96/1 | 388 | 79.5 |

This example, in which runs similar to those of Example I were carried out, but in a larger reactor using larger quantities of reactants and initiator ingredients, shows an increase in isotactic content similar to that of the previous runs.

The polymers produced in accordance with this invention have utility and application where solid plastics are used. They can be molded to form articles of any desired shape such as bottles or other types of containers. Furthermore, they can be formed into sheets, film or pipe by extrusion or other suitable method.

It will be apparent to those skilled in the art that many variations and modifications of the invention can be practiced upon a study of the foregoing disclosure. Such variations and modifications are believed to come within the spirit and scope of the invention.

We claim:

1. In a process for the preparation of solid olefin polymers having a high isotactic content from an olefin corresponding to the formula R—CH=CH₂, wherein R is selected from the group consisting of an alkyl radical containing from 1 to 4, inclusive, carbon atoms, a phenyl radical, and an alkyl-substituted phenyl radical, the total number of carbon atoms in said substituted alkyl groups being in the range of 1 to 6, inclusive, carbon atoms, in the presence of an initiator which forms on mixing at least two essential components, one of said components being a metal compound selected from the group consisting of tri- and tetra-chlorides, tri- and tetra-bromides, and tri- and tetra-iodides of a metal selected from the group consisting of titanium, zirconium, hafnium, vanadium, niobium and tantalum, and another of said components being selected from the group consisting of (1) organometal compounds of metals selected from the group consisting of aluminum, gallium, indium, beryllium, sodium, potassium, lithium, rubidium, cesium, magnesium, cadmium, mercury, zinc, and barium in which at least one of the valences of the metal is satisfied with a radical selected from the group consisting of alkyl, cycloalkyl and aryl radicals having individually up to 15 carbon atoms and collectively up to 40 carbon atoms per molecule and in which any remaining valences of the metal are satisfied with atoms selected from the group consisting of hydrogen and halogen, (2) hydrides of metals selected from the group consisting of aluminum, barium, gallium, indium and beryllium, (3) complexes of such hydrides with alkali metals selected from the group consisting of lithium, sodium, and potassium, and (4) a metal selected from the group consisting of sodium, magnesium and aluminum, the improvement comprising carrying out the polymerization in the presence of 0.1 to 2.5 gram atoms of elemental sulfur per mole of said one component contained in said initiator.

2. In a process for polymerizing propylene to form a polymeric product having a high isotactic content in the presence of an initiator which forms on mixing at least two essential components, one of said components being a metal compound selected from the group consisting of tri- and tetra-chlorides, tri- and tetra-bromides, and tri- and tetra-iodides of a metal selected from the group consisting of titanium, zirconium, hafnium, vanadium, niobium, and tantalum, and another of the said components being selected from the group consisting of (1) organometal compounds of metals selected from the group consisting of aluminum, gallium, indium, beryllium, sodium, potassium, lithium, rubidium, cesium, magnesium, cadmium, mercury, zinc, and barium in which at least one of the valences of the metal is satisfied with a radical selected from the group consisting of alkyl, cycloalkyl and aryl radicals having individually up to 15 carbon atoms and collectively up to 40 carbon atoms per molecule and in which any remaining valences of the metal are satisfied with atoms selected from the group consisting of hydrogen and halogen, (2) hydrides of metals selected from the group consisting of aluminum, barium, gallium, indium and beryllium, (3) complexes of such hydrides with alkali metals selected from the group consisting of lithium, sodium, and potassium, and (4) a metal selected from the group consisting of sodium, magnesium and aluminum, the improvement comprising carrying out the polymerization of said propylene in the presence of 0.1 to 2.5 gram atoms of elemental sulfur per mole of said one component contained in said initiator.

3. A process according to claim 1 wherein said one component is a titanium halide and said another component is a trialkylaluminum.

4. A process according to claim 3 wherein said one component is titanium trichloride and said another component is triethylaluminum.

5. A process according to claim 2 wherein said one component is a titanium halide and said another component is a trialkylaluminum.

6. A process according to claim 5 wherein said one component is titanium trichloride and said another component is triethylaluminum.

7. A process for polymerizing propylene to a solid polymer having a high isotactic content in which said propylene is contacted with an initiator which forms on mixing a trialkylaluminum and a titanium trihalide in the presence of a hydrocarbon diluent at a temperature in the range of 100 to 350° F. and at a pressure in the range of 50 to 1500 p.s.i.g., the improvement which comprises conducting said contacting in the presence of 0.1 to 2.5 gram atoms of elemental sulfur per mole of said titanium trihalide contained in said initiator.

8. A process according to claim 7 in which said initiator is that which forms on mixing triethylaluminum and titanium trichloride.

References Cited in the file of this patent

UNITED STATES PATENTS

| | | |
|---|---|---|
| 2,843,577 | Friedlander et al. | July 15, 1958 |
| 2,905,645 | Anderson et al. | Sept. 22, 1959 |
| 2,980,662 | Jezl | Apr. 18, 1961 |